(12) United States Patent
Walker et al.

(10) Patent No.: US 7,912,580 B2
(45) Date of Patent: Mar. 22, 2011

(54) PRODUCTS AND PROCESSES FOR CONTROLLING ACCESS TO VENDING MACHINE PRODUCTS

(75) Inventors: Jay S. Walker, Ridgefield, CT (US); Paul T. Breitenbach, Wilton, CT (US); Daniel E. Tedesco, Huntington, CT (US); James A. Jorasch, New York, NY (US); Robert C. Tedesco, Fairfield, CT (US)

(73) Assignee: Walker Digital, LLC, Stamford, CT (US)

( * ) Notice: Subject to any disclaimer, the term of this patent is extended or adjusted under 35 U.S.C. 154(b) by 424 days.

(21) Appl. No.: 12/031,323

(22) Filed: Feb. 14, 2008

(65) Prior Publication Data

US 2008/0161082 A1 Jul. 3, 2008

Related U.S. Application Data

(63) Continuation of application No. 11/063,714, filed on Feb. 22, 2005, now Pat. No. 7,353,080.

(60) Provisional application No. 60/545,775, filed on Feb. 19, 2004.

(51) Int. Cl.
  *G06F 17/00* (2006.01)
(52) U.S. Cl. ........................ 700/237; 700/240
(58) Field of Classification Search .................. 700/237, 700/244
See application file for complete search history.

(56) References Cited

U.S. PATENT DOCUMENTS

| | | | |
|---|---|---|---|
| 5,004,966 A | 4/1991 | Eakin | 318/446 |
| 5,559,714 A | 9/1996 | Banks | 700/233 |
| 5,822,216 A | 10/1998 | Satchell | 700/232 |
| 5,845,256 A | 12/1998 | Pescitelli | 705/4 |
| 5,954,640 A | 9/1999 | Szabo | 600/300 |
| 6,115,649 A | 9/2000 | Sakata | 700/241 |
| 6,119,932 A | 9/2000 | Maloney | 235/380 |
| 6,161,059 A * | 12/2000 | Tedesco et al. | 700/232 |
| 6,360,139 B1 * | 3/2002 | Jacobs | 700/232 |
| 6,443,843 B1 | 9/2002 | Walker | 463/42 |
| 6,539,282 B2 * | 3/2003 | Metcalf et al. | 700/237 |
| 6,571,150 B2 | 5/2003 | Arai | 700/236 |
| 6,629,019 B2 * | 9/2003 | Legge et al. | 700/237 |
| 6,688,982 B2 | 2/2004 | Moodie | 463/41 |
| 6,711,465 B2 * | 3/2004 | Tomassi | 700/236 |
| 6,782,307 B2 | 8/2004 | Wilmott | 700/233 |
| 6,863,606 B1 | 3/2005 | Berg | |
| 7,079,922 B2 | 7/2006 | Komai | 700/237 |

(Continued)

OTHER PUBLICATIONS

"Preventing Obesity Among Children", Chronic Disease Notes & Reports, vol. 13, No. 1, Winter 2000, 20 pp.

(Continued)

*Primary Examiner* — Timothy R Waggoner
(74) *Attorney, Agent, or Firm* — Fincham Downs, LLC; Carson C. K. Fincham (57) ABSTRACT

An embodiment of the invention includes receiving a request to purchase a product from a vending machine. At least one question to be output is determined, and the determined question is output. An interface is provided which that permits at least one answer to the at least one question to be entered by a customer. At least one answer to the at least one question is received via the interface. Based on the answer, a level of access to one or more products available for sale by the vending machine is determined. A product is provided if the level of access permits providing of a product.

18 Claims, 2 Drawing Sheets

U.S. PATENT DOCUMENTS

| | | | |
|---|---|---|---|
| 2002/0032582 A1 | 3/2002 | Feeney | 705/2 |
| 2002/0116088 A1 | 8/2002 | Rowe | 700/237 |
| 2002/0143619 A1* | 10/2002 | Laurie | 705/14 |
| 2002/0161476 A1 | 10/2002 | Panofsky | 700/231 |
| 2006/0099310 A1 | 5/2006 | Koekkoek | 426/331 |
| 2006/0293956 A1 | 12/2006 | Walker | 705/14 |

OTHER PUBLICATIONS

Severson, Kim, "Oakland Schools Ban Vending Machine Junk Food", The San Francisco Chronicle, Jan. 16, 2002, 2pp.

"School Vending Machines 'Out' with Health Advocates", Health News, Today's Health News, Reuters Health, (http //12 31 13 48/HealthNews/reuters/NewsStory071420031 htm), Jul. 14, 2003, 3pp.

"Ban soft drinks from Pa. School vending machines", Opinion, Public Opinion Online.com, Jul. 15, 2003, (http www publicopiniononline com/news/stories/20030715/opinions/576507 html), 2pp.

Day, Sherri, "Coke Moves With Caution to Remain in Schools", The New York Times, Sep. 2, 2003, 3pp.

O'Connor, Anahad et al., "F.D.A. Moves to Let Drug Treat Obese Teenagers", The New York Times, Dec. 16, 2003, Section: Health, 4pp.

"Illinois Gov. Rod Blagojevich proposes banning vending machines in schools", AMOnline, Dec. 19, 2003, 2pp.

"Canadian soft drink industry voluntarily removes soda from elementary schools", AMOnline, Jan. 7, 2004, 2pp.

"Indiana education department supports bill promoting healthier food in school vending machines", Vending Market Watch, Jan. 8, 2004, (http //www vendingmarketwatch com/content/search asp), 2pp.

Website: "Coin in the Slot Service to Help Junkies", News & Updates, (http //www wai quik co nz/ironic1/news-articles-003 html), download date: Jan. 12, 2004, 2pp.

"Illinois educators blast the governor's ban on soft drinks in school vending machines", Vending Market Watch, Feb. 12, 2004, (http //www vendingmarketwatch com/content/search asp), 3pp.

"NAMA Responds to CSPI Media Blitz Favoring School Vending Regulation" Vending Times, Jun. 2004, vol. 44, No. 6, 2pp.

Office Action for U.S. Appl. No. 11/063,714 dated Aug. 31, 2007, 7pp.

Office Action for U.S. Appl. No. 11/063,714 dated Feb. 21, 2007, 8pp.

Notice of Allowability for U.S. Appl. No. 11/063,714 dated Nov. 28, 2007, 2pp.

* cited by examiner

FIG. 1

FIG. 2

PRODUCTS AND PROCESSES FOR CONTROLLING ACCESS TO VENDING MACHINE PRODUCTS

CROSS-REFERENCE TO RELATED APPLICATIONS

The present application is a continuation application that claims priority and benefit under 35 U.S.C. §120 to U.S. patent application Ser. No. 11/063,714 entitled "PRODUCTS AND PROCESSES FOR CONTROLLING ACCESS TO VENDING MACHINE PRODUCTS", filed Feb. 22, 2005 now U.S. Pat. No. 7,353,080 and allowed on Nov. 28, 2007; which application claims the benefit of priority of U.S. provisional Patent Application No. 60/545,775, entitled "APPARATUS, SYSTEM AND METHOD FOR CONTROLLING ACCESS TO VENDING MACHINE PRODUCTS", filed on Feb. 19, 2004.

Each of the above-referenced applications is incorporated by reference herein in its entirety.

DETAILED DESCRIPTION

In the following description, reference is made to the accompanying drawings that form a part of the present disclosure, and in which are shown, by way of illustration, specific embodiments of the invention. These embodiments are described in sufficient detail to enable those skilled in the art to practice the invention, and it is to be understood that other embodiments may be utilized and that structural, logical, software, electrical and other changes may be made without departing from the scope of the present invention. The present disclosure is, therefore, not to be taken in a limiting sense. The present disclosure is neither a literal description of all embodiments of the invention nor a listing of features of the invention which must be present in all embodiments.

Numerous embodiments are described in this patent application, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with various modifications and alterations. Although particular features of the present invention may be described with reference to one or more particular embodiments or figures, it should be understood that such features are not limited to usage in the one or more particular embodiments or figures with reference to which they are described.

The terms "an embodiment", "embodiment", "embodiments", "the embodiment", "the embodiments", "an embodiment", "some embodiments", and "one embodiment" mean "one or more (but not all) embodiments of the present invention(s)" unless expressly specified otherwise.

The terms "including", "comprising" and variations thereof mean "including but not limited to", unless expressly specified otherwise.

The term "consisting of" and variations thereof mean "including and limited to", unless expressly specified otherwise.

The enumerated listing of items does not imply that any or all of the items are mutually exclusive. The enumerated listing of items does not imply that any or all of the items are collectively exhaustive of anything, unless expressly specified otherwise. The enumerated listing of items does not imply that the items are ordered in any manner according to the order in which they are enumerated.

The terms "a", "an" and "the" mean "one or more", unless expressly specified otherwise.

The methods described herein (regardless of whether they are referred to as methods, processes, algorithms, calculations, and the like) inherently include one or more steps. Therefore, all references to a "step" or "steps" of such a method have antecedent basis in the mere recitation of the term 'method' or a like term. Accordingly, any reference in a claim to a 'step' or 'steps' of a method is deemed to have sufficient antecedent basis.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are illustrative arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, other formats (including relational databases, object-based models and/or distributed databases) could be used to store and manipulate the data types described herein. Likewise, object methods or behaviors of a database can be used to implement the processes of the present invention. In addition, the databases may, in a known manner, be stored locally or remotely from a device which accesses data in such a database.

Overview

Products and processes are disclosed for controlling access to vending machine products. According to various embodiments of the present invention, a vending machine control system is configured to output one or more questions to a customer (e.g., after the customer attempts to purchase a product from the vending machine), and the vending machine receives answer(s) from the customer in response to the question(s). Access to the vending machine then proceeds in various manners according to various embodiments described herein.

For example, according to one embodiment, the vending machine determines if the provided answer(s) are correct or incorrect, and determines a level of access to one or more vending machine products accordingly. According to one embodiment, the vending machine sets or adjusts pricing for vending machine products based on the provided answer(s) (e.g., whether the answer is correct, based on the percentage of correct answers to a set of questions). According to one embodiment, the vending machine provides access after the question(s) have been answered, regardless of the answer(s).

In one embodiment, a vending machine control system is configured to output health-related educational questions to a potential customer, receive an answer from the potential customer in response to the question, determine if the provided answer is correct, and if so, permit access to one or more vending machine products by enabling transaction processing functionality. When a vending machine in accordance with such an embodiment is located in schools or other settings frequented by children or teenagers, the demand for vended food and drink can be used to educate such consumers about health-related subject matter, such as the nutritional content of various foods and drinks. In this manner, such embodiments permit school administrators and parents to educate children about healthy behaviors without unduly restricting choice or access to food and beverage products.

Further, in an embodiment where questions are output based on the selection of a particular product the customer desires to purchase (e.g. where a customer selects a particular candy bar, a question about the nutritional value of that candy bar that type of candy bar is output), that embodiment would function to ensure that the customer essentially provides his or her "informed consent" before purchasing that product.

In another embodiment, a vending machine control system is configured to output sports-related educational questions to a customer, receive an answer from the customer in response to the question, determine if the provided answer is correct, and if so, provide the customer with a benefit, such as a free product or a discount to be applied toward the purchase of a product.

Many other embodiments are contemplated, as discussed herein.

Definitions

The following terms are defined as indicated below, unless explicitly described otherwise:

Fill Period, Sales Period—The period of time between restock dates. Typically, the fill period of a given vending machine does not vary significantly or at all.

Full Price, Retail Price—In some embodiments, the normal price charged for the purchase of one unit of a given product.

Operator—The owner (or agent thereof) of a vending machine.

Product, Item—A good or service provided (e.g., sold) by a vending machine or via a vending machine. Examples of goods sold at vending machines include beverages (e.g. cans of soda) and snacks (e.g. candy bars). Examples of services sold by vending machines include car washes, photography services and access to digital content (e.g. providing wireless Internet access, providing wireless telephone service, permitting the downloading of MP3 files to a portable device such as a handheld MP3 player, permitting or facilitating the downloading of digital "ring tone" or other files to a handheld device such as an iPod™ music player or cellular telephone).

Questions, Question Content, Educational Questions, Trivia Questions—Content that is provided to a customer or prospective customer of a vending machine, and which requires a response from the customer. In various embodiments, questions are provided for the purpose of determining a level of access to one or more vending machine products.

Questions are typically stored in a memory in conjunction with an indication of a correct answer. In some embodiments, questions are multiple-choice questions, and are presented with multiple answer choices. The potential subject matter addressed by questions is broad, including a wide range of topics, such as health, sports, history, prices of consumer goods/services, and the like.

Restock Date, Restock Time—The time and/or date that a vending machine is scheduled to be restocked by an operator of a vending machine. Typically, a restock date follows the end of a fill period.

Vending Machine Apparatus and System Architecture

Generally, a vending machine can include a device configured to manage sales transactions with customers by, among other things, receiving payment from customers and controlling the pricing and/or distribution of products.

Machine Casing/Cabinetry

In some embodiments, suitable machine cabinetry may be constructed from any combination of (1) commercial grade (e.g. sixteen-gauge) steel (e.g., for exterior panels and internal shelving), (2) transparent materials such as glass or Plexiglas (e.g., for item display windows), (3) rubber (e.g., for waterproofing insulation), (4) plastic, (5) aluminum, and/or (6) any suitable material.

Many commercially available machine casings can be modified to work in accordance with the embodiments disclosed herein. For example, in snack machine embodiments, a suitable machine casing may comprise the 129 SnackShop manufactured by Automatic Products International, Ltd. Of Saint Paul, Minn., which stands at 72"/1829 mm wide, has a width of 38⅞"/1988 mm, and a depth of 35"/889 mm. Other suitable snack machine casings include the A La Carte® machine from Automatic Products, and the GPL SnackVendor model #159 from Crane Merchandising Systems/Crane Co. of Stamford, Conn.

In beverage machine embodiments, machine casings such as those commercially available from Dixie Narco, Inc. of Williston, S.C. may be employed. Beverage machine casings may comprise a "cooler" or "glass front" style front panel, featuring a transparent front panel (e.g., glass) enabling customers to see inventory for sale. Alternatively, beverage machine casings may comprise a "bubble front" style front panel, featuring a decorative front panel, typically used to advertise a logo of a product manufacturer commercially interested in the vending machine's operation.

Other embodiments are contemplated as well, including combination snack and beverage vending machine embodiments, such as those available from Crain Co. Further details concerning the suitability of machine casing/cabinetry are well known in the art.

Inventory Storage and Dispensing Mechanisms

Inventory storage and distribution functions of a vending machine configured in accordance with a snack machine embodiment may include one or more of: (i) a drive motor, (ii) metal shelves, (iii) a product delivery system (e.g., a chute, product tray, product tray door, etc.), (iv) dual spiral (i.e. double helix) item dispensing rods, (v) convertible (i.e. extendable) shelves, and/or (vi) a refrigeration unit. In embodiments using the casing of the model 129 SnackShop manufactured by Automatic Products, 3 removable shelves may be employed, together providing for 30 product rows and an inventory capacity of between 185 to 522 commonly vended snack products.

Inventory storage and distribution functions of a vending machine configured in accordance with a beverage machine embodiment may include one or more of: (i) metal and/or plastic shelving, (ii) item dispensing actuators/motors, (iii) product delivery chutes, and/or (iv) a refrigeration unit.

Further details concerning vending machine inventory storage and dispensing mechanisms are well known in the art.

Payment Processing Mechanisms

The vending machine may also include one or more mechanisms for receiving payment and dispensing change, including a coin acceptor, a bill validator, a card reader (e.g., a magnetic stripe reader) and a change dispenser.

In a manner known in the art, a magnetic stripe card reader may read data on the magnetic stripe of a credit or debit card, and it may cooperate with conventional point-of-sale credit card processing equipment to validate card-based purchases through a conventional transaction authorization network. Suitable card-based transaction processing systems and methods are available from USA Technologies, Inc.

The coin acceptor, bill validator and change dispenser may communicate with a currency storage apparatus (a "hopper") and may comprise conventional devices such as models AE-2400, MC5000, TRC200 by Mars, Inc. of West Chester, Pa., or CoinCo model 9300-L. The coin acceptor and bill validator may receive and validate currency that is stored by the currency storage apparatus. Further, a bill validator or coin acceptor may be capable of monitoring stored currency and maintaining a running total of the stored currency, as is discussed with reference to U.S. Pat. No. 4,587,984, entitled COIN TUBE MONITOR MEANS, the entirety of which is incorporated by reference herein. The change dispenser activates the return of coinage to the customer where appropriate (e.g., where a customer rejects or otherwise fails to accept a dynamically priced upsell offer). Such apparatus may feature Multidrop Bus (MDB) and/or Micromech peripheral capabilities, as is known in the art.

In another embodiment, a vending machine may be configured to receive payment authorization and product selection commands through a wireless device communication network, directly or indirectly, from a customer's wireless device (e.g., a cellular telephone). In such an embodiment, a payment processing mechanism may comprise a cellular transceiver operatively connected to a processor, as described herein. Exemplary systems and methods allowing for the selection of and payment for vending machine articles through cellular telephones are provided by USA Technologies, Inc., of Wayne, Pa. Further, in some embodiments, a customer's cellular telephone may serve as an input/output device, as described herein.

Further details concerning vending machine payment processing mechanisms are well known in the art.

Input/Output Devices

A vending machine may include an input device for receiving input from (i) a customer indicating a product and/or answer selections (e.g. in response to questions), (ii) an operator during stocking or maintenance of the vending machine, and/or (iii) any other individual (e.g. an individual who inputs questions into a machine, such as a teacher who inputs questions into machines periodically). Also, a vending machine may include one or more output devices for outputting product and/or question content to a customer and/or operator.

Many combinations of input devices and output devices may be employed. In some embodiments, a vending machine may include more than one input device. For example, a vending machine may include an exterior input device for receiving customer input and an interior input device for receiving operator input. In some embodiments, however, the input device provides the dual functionality of receiving input data from both operators and customers. Likewise, a vending machine may comprise more than one output device (e.g., an LCD screen and several LEDs, as described herein). However, in some embodiments (such as those which feature touch screens), input and output functionality may be provided by a single device.

Many input devices are contemplated. Thus, an input device may comprise one or more of the following: (i) a set of alpha-numeric keys for providing input to the vending machine, such as the Programmable Master Menu® Keypad, (ii) a selector dial, (iii) a set of buttons associated with a respective set of item dispensers, (iv) a motion sensor, (v) a barcode reader (e.g., a 1-D or 2-D barcode reader), (vi) a voice recognition module, (vii) a Dual-Tone Multi-Frequency receiver/decoder, (viii) a wireless device (e.g., a cellular telephone or wireless Personal Digital Assistant), (ix) a radio-frequency identification receiver, (x) a smart card reader, (xi) a magnetic stripe reader, and (xii) any other conventional input device commonly employed by a vending machine designer.

In some embodiments, a vending machine may comprise an input device (e.g., a sensor which detects radio frequency electromagnetic signals of within a certain frequency range, a signal transceiver) operable to receive a signal (e.g., a 0.6 Watt radio frequency electromagnetic signal between 824 and 850 MHz, an infrared signal) from a cellular phone or other handheld device. In one embodiment, a vending machine input device comprises an optical reader (e.g., a 2-D bar code scanner) capable of scanning a barcode, such as a bar code which is displayed on a screen or monitor of a user's cellular phone, PDA, Blackberry business phone, Blackberry handheld or other handheld device. One system employing such technology, the Cmode service, has been developed by a partnership between Coca-Cola Co. and NTT DoCoMo Inc. of Japan.

Likewise, many types of output devices are contemplated. For example, an output device may comprise a Liquid Crystal Display (LCD). Alternatively or additionally, an output device may also comprise one or more Light Emitting Diode (LED) displays (e.g., several alphanumeric LED displays on the shelves of a vending machine, each LED display associated proximately with a row of product inventory).

In one embodiment, an LED display screen is mounted atop the vending machine (via bolts or other known mounting hardware) and may be used, e.g., to communicate offers and other messages (e.g., product advertisements) to prospective customers. A suitable LED display screen for such an embodiment may be housed in an aluminum case having a length of 27.5", a height of 4.25", and a depth of 1.75". Such a display screen may have a display area capable of showing 13 alphanumeric and/or graphical characters. Further, such an LED display screen may comprise a serial computer interface, such as an RJ45/RS232 connector, for communicating with a processor, as described herein. Further still, such an LED display may be capable of outputting text and graphics in several colors (e.g., red, yellow, green, black), and such text may involve, e.g., questions.

Further, in some embodiments, an output device comprises a printer. In one embodiment, a printer is configured to print on card stock paper (e.g., 0.06 mm to 0.15 mm thickness), such as the EPSON EU-T400 Series Kiosk Printer. Further, a printer may be capable of thermal line printing of various alphanumeric and graphical symbols in various font sizes (e.g., ranging from 9 to 24 point) on various types of paper. Additionally, such a printer may communicate with a processor (described herein) via an RS232/IEEE 12834 and/or bi-directional parallel connection. Such a printer may further comprise a 4 KB data buffer.

Additionally, in some embodiments, an output device comprises an audio module, such as an audio speaker, that outputs information to customers audibly. As is known, such speakers may be used to produce prerecorded and/or synthesized sounds which may be stored as computer files in a variety of formats (e.g., .wav files, .mp3 files, .wma files).

In some embodiments, a touch-sensitive screen may be employed to perform both input and output functions. Suitable, commercially available touch screens for use in accordance with various embodiments are manufactured by Elo TouchSystems, Inc., of Fremont, Calif., such as Elo's AccuTouch series touch screens. Such touch screens may comprise: (i) a first (e.g., outer-most) hard-surface screen layer coated with an anti-glare finish, (ii) a second screen layer coated with a transparent-conductive coating, (iii) a third screen layer comprising a glass substrate with a uniform-conductive coating. Further, such touch screens may be configured to detect input within a determined positional accuracy, such as a standard deviation of error less than ±0.080-inch (2 mm). The sensitivity resolution of such touch screens may be more than 100,000 touchpoints/in$^2$ (15,500 touchpoints/cm$^2$) for a 13-inch touch screen. For such touch screens, the touch activation force required to trigger an input signal to the processor (described herein) via the touch screen is typically 2 to 4 ounces (57 to 113 g). Additionally, touch screens for use may be resistant to environmental stressors such as water, humidity, chemicals, electrostatic energy, and the like. These and other operational details of touch screens (e.g., drive current, signal current, capacitance, open circuit resistance, closed circuit resistance, etc.) are well known in the art.

Logic/Control/Processing Apparatus

The components of the vending machine, including the input devices, output devices, coin acceptor, bill validator, card (e.g., magnetic stripe) reader, change dispenser, currency storage apparatus, and product dispensing mechanism(s) (collectively, the "peripherals") communicate with, and are controlled by, a control system or processor, such as one based on the Intel® Pentium® series processor. The processor may be in communication with a memory and a communications port (e.g., for communicating with one or more other computers, vending machines and the like). The memory may comprise an appropriate combination of magnetic, optical and/or semiconductor memory, and may include, for example, Random Access Memory (RAM), Read-Only Memory (ROM), a compact disc and/or a hard disk. The memory may comprise or include any type of computer-readable medium. The processor and the memory may each be, for example: (i) located entirely within a single computer or other device; or (ii) connected to each other by a remote communication medium, such as a serial port cable, telephone line or radio frequency transceiver.

A memory may store a program for controlling a processor. The processor performs instructions of the program, and thereby operates in accordance with the processes described in detail herein. The program may be stored in a compressed, uncompiled and/or encrypted format. The program furthermore includes program elements that may be necessary, such as an operating system, a database management system and "device drivers" for allowing the processor to interface with the peripherals. Appropriate program elements are known to those skilled in the art, and need not be described in detail herein.

According to an embodiment of the present invention, the instructions of the program may be read into a main memory from another computer-readable medium, such as from a ROM. The execution of sequences of the instructions in a program causes the processor to perform the process steps described herein. In alternate embodiments, hard-wired circuitry may be used in place of, or in combination with, software instructions for implementation of the processes described herein. Thus, one of ordinary skill in the art will readily recognize that embodiments of the present invention are not limited to any specific combination of hardware and software.

The memory also may store one or more databases. Some or all of the data stored in various illustrated databases are described herein.

Thus, the machine's processing apparatus, in conjunction with the peripherals (e.g., through RS232 connections and/or other suitable connections), manages interactions with the user in accordance with stored business logic, described herein.

Retrofitting Conventional Vending Machines with a Separate Device

In one embodiment, one or more of the processor, the input device(s), RAM, ROM, output device(s) and a data storage device may be included, wholly or partially, in a separate device, such as the e-Port™ by USA Technologies Inc., that is in communication with a vending machine. The separate device may also be in communication with a network such as the Internet.

The e-Port™ is a credit and smart card-accepting unit that controls access to office and MDB vending equipment, and serves as a point of purchase credit card transaction device. The e-Port™ includes an LCD that allows for the display of color graphics, and a touch sensitive input device (touch screen) that allows users to input data to the device. The display may be used to prompt users interactively with, e.g., offers and information about their transaction status.

The separate device may alternatively be a programmed computer running appropriate software for performing the necessary functions described herein. The separate device may be operable to receive input from customers (e.g. answers to questions), receive payment from customers, exchange information with a remotely located server (e.g. download new questions; upload answers) and/or display messages to customers (e.g. question content). The separate device may be operable to instruct the vending machine that appropriate payment has been received (e.g., via a credit card read by the separate device), that a question has been answered correctly, and/or that a particular product or products should be dispensed by the vending machine. Further, a separate device may be operable to instruct the vending machine to execute promotions, price changes, or the like.

Thus, a separate device may be operatively connected to a vending machine to perform various processes described herein. In this manner, conventional vending machines may be retrofitted with such separate devices so as to perform the processes described herein.

Other Separate Devices

It should be noted that, in some embodiments, some or all of the functions and method steps described herein may be performed partially or entirely by one or more separate devices which are not necessarily retrofitted to a vending machine. Separate devices for use with such an embodiment include, but are not limited to, kiosks, computers, personal digital assistants (PDAs), and cellular telephones.

In some embodiments featuring separate devices, such separate devices may not necessarily communicate with the vending machine control system. For example, one or more separate devices may facilitate question and answer sessions, and based on a potential customer's success at answering one or more questions, the separate device(s) may output "access codes" that permit the customer to transact with one or more vending machines (e.g. machines proximately located to the separate device). Vending machines in accordance with such an embodiment may store access codes in one or more databases, and may be programmed to require such codes before vending products. That is, when customers attempt to purchase items from the one or more vending machines, the machines may prompt (e.g. through an output device) customers for access codes. Thus, a customer may be required to first successfully answer one or more questions at a separate device (e.g. a separate "trivia game" kiosk or a personal computer located in his or her office) to gain an access code, and then present the access code to the vending machine (e.g. through the vending machine's input device) in order to purchase vending machine products.

In some embodiments featuring separate devices, such separate devices are capable of communicating with a remote computer (other than the vending machine's on-board control system), but not necessarily with a vending machine control system. For example, in such embodiments, question content may be downloaded from, and answer selections may be uploaded to, a remote computer, such as a computer that hosts a web site or an Interactive Voice Response Unit (IVRU) operated or otherwise affiliated with a vending machine operator. For example, a customer may use a personal computer to log onto a web site operated by or affiliated with a vending machine operator, answer one or more questions, and receive a code good for a $0.50 discount at any participating vending machine. Or, a customer may walk up to a vending machine and observe signage reading "Want $0.50 off? Call 1-800-NEXTVEND and play our trivia game." The customer may call the phone number with her cellular phone and may participate in an educational trivia game hosted by an IVRU, providing her answers to multiple choice questions by depressing keys on her phone which, in turn, sends DTMF signals to the IVRU. The IVRU may then, depending on her answers, transmit a code enabling her to receive a $0.50 discount off merchandise at the vending machine.

In other embodiments featuring separate devices, such devices may be capable of communicating, directly (e.g., via BlueTooth™ connectivity) or indirectly (e.g., through web server or IVRU), to a vending machine control system in order to facilitate the inventive functionality described herein. Such embodiments are described more fully below with reference to the Network Embodiments section.

Network Embodiments

Embodiments can be configured to work in a network environment including a computer (e.g. a personal computer, mainframe, PDA, cell phone, or other device) that is in communication, via a communications network, with one or more vending machines. The computer may communicate with the vending machines directly or indirectly, via a wired or wireless medium such as the Internet, LAN, WAN or Ethernet, Token Ring, or via any appropriate communications means or combination of communications means. Each of the vending machines may comprise computers, such as those based on the Intel® Pentium® or Centrino™ processor, that are adapted to communicate with the computer. Any number and type of machines may be in communication with the computer.

Communication between the vending machines and the computer, and among the vending machines, may be direct or indirect, such as over the Internet through a Web site maintained by a computer on a remote server or over an on-line data network including commercial on-line service providers, bulletin board systems and the like. In yet other embodiments, the vending machines may communicate with one another and/or the computer over RF, cable TV, satellite links and the like.

Some, but not all, possible communication networks that may comprise the network or be otherwise part of the system include: a local area network (LAN), a wide area network (WAN), the Internet, a telephone line, a cable line, a radio channel, an optical communications line, and a satellite communications link. Possible communications protocols that may be part of the system include: Ethernet (or IEEE 802.3), SAP, ATP, Bluetooth™, and TCP/IP. Communication may be encrypted to ensure privacy and prevent fraud in any of a variety of ways well known in the art.

Those skilled in the art will understand that vending machines and/or computers in communication with each other need not be continually transmitting to each other. On the contrary, such vending machines and/or computers need only transmit to each other as necessary, and may actually refrain from exchanging data most of the time. For example, a vending machine in communication with another machine via the Internet may not transmit data to the other machine for weeks at a time.

In an embodiment, a server computer may not be necessary and/or preferred. For example, in one or more embodiments, a stand-alone vending machine and/or a vending machine in communication only with one or more other vending machines may be employed. In such an embodiment, any functions described as performed by the server computer or data described as stored on the server computer may instead be performed by or stored on one or more vending machines.

In other embodiments, a vending machine may be in communication with a remote computer, such as a server, that provides the vending machine with and/or receives from the vending machine, e.g., all or some of the data described herein, including questions and answers. Thus, in certain embodiments, the server may comprise certain elements or portions of certain elements such as a data storage device/memory.

In some embodiments, the remote computer may be accessible, directly or indirectly, via a separate device (such as a personal computer, PDA or telephone) by a customer or operator. Accordingly, a customer or operator may use a device to communicate with the remote computer. A device may receive from the remote computer messages described herein as being output by the vending machine (e.g. questions and possible answer choices), and/or may transmit to the remote computer input described herein as being provided to the vending machine (e.g. questions and answer selections). Thus, various data described herein as received through an input device of a vending machine (e.g. answer selections) may be received by the vending machine from a separate device (e.g. through a BlueTooth™ connection) or from a remote computer (which may relay data first received from a device such as a personal computer). Similarly, various data described herein as received through an input device of a vending machine may be received through a Web browser communicating with a remote server, which in turn communicates with the vending machine. Thus, an owner/operator of the vending machine may have remote polling and reporting capabilities, may be able to transmit new business rules (e.g., new question and answer sets) to the vending machine, and the like.

General Software Architecture

In one embodiment, a software-based control system executes instructions for managing the operation of the vending machine, and in particular in accordance with the inventive functionality described herein. Such vending machine operations include, but are not limited to: (1) item pricing (e.g. displaying prices via an LED, changing such prices where customers have answered a question or questions correctly, etc.), (2) receiving customer product selections via an input device, (3) processing payment via a payment processing mechanism (including crediting customers for providing correct answers to questions), (4) outputting question content, (5) receiving answer selections from customers, (6) determining the correctness of received answer choices, and (7) actuating corresponding item dispensing mechanisms.

In some embodiments, machine peripherals (e.g. machine hardware, including mechanical hardware such as input devices, output devices, inventory dispensing mechanisms, and payment processing mechanisms including coin acceptors, bill validators, card readers, change dispensers, etc.) will be controlled by the software-based control system through an interface, such as a standard RS-232 serial interface. In such embodiments, embedded API/devices may be used to enable the software to actuate/control vending machine peripherals via RS-232 connectivity. Such vending machine peripherals may be operatively connected to the control system directly or indirectly, in any manner that is practicable.

Figure 1:
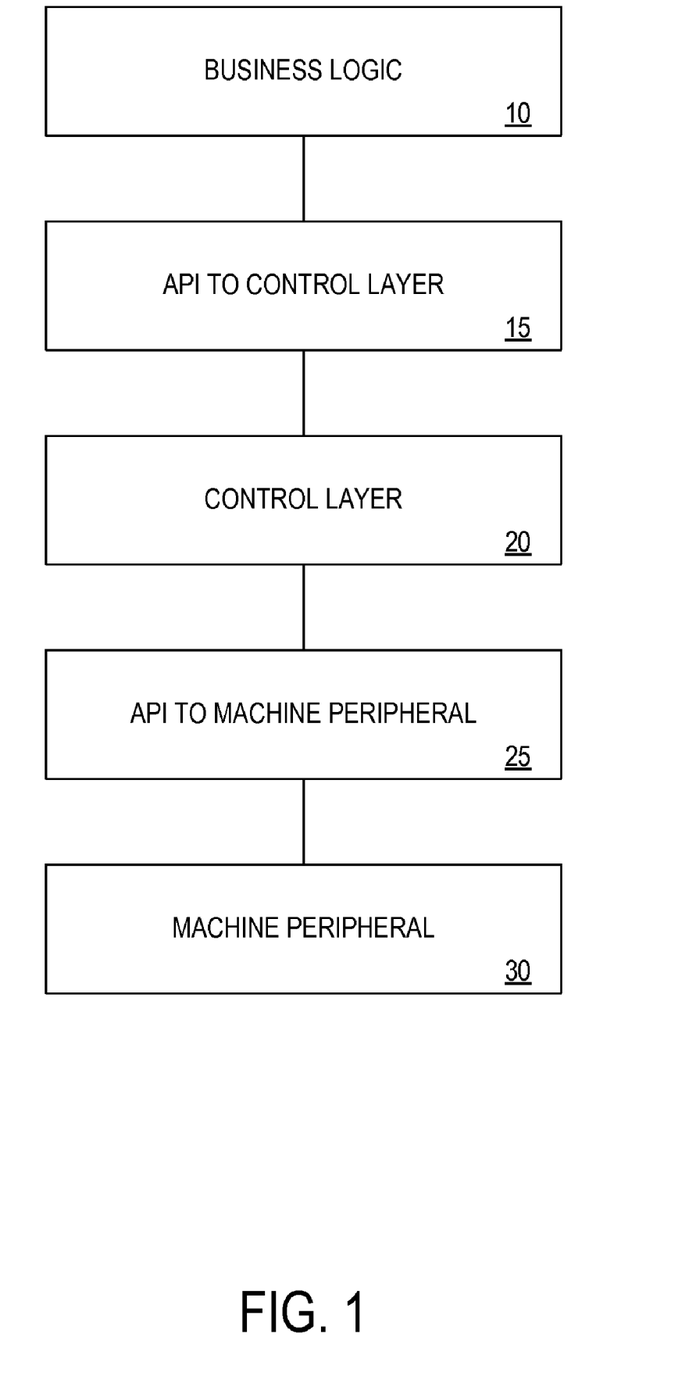
FIG. 1 depicts an illustrative division of software functionality pursuant to an embodiment of the invention.

As illustrated by FIG. 1, in one embodiment control software can be divided into three abstract components. Such division may provide a clear partition of tasks, which may be desirable so that any future modification and new programming can be applied without disrupting other components. Turning to FIG. 1, the three abstract components are illustrated, including a Business Logic component 10, a Control Layer component 20, and an exemplary Machine Peripheral component 30. As stated earlier, more machine peripherals may be employed. The Business Logic component 10 is connected to Control Layer component 20 via API 15; Control Layer component 20 is connected to Machine Peripheral component 30 via API 25.

Turning to FIG. 1, the Business Logic component 10 visually represents the portion of the software that accesses and outputs questions, receives answers, determines the correctness of answers, and controls access to vending machine products accordingly, as discussed herein. Such a component may access various databases, such as a question database, an answer database, and/or a discount database to perform such functions. The Control Layer component 20 visually represents the portion of the software which interfaces with at least one Machine Peripheral component 30, and thereby transmits commands to perform such functions as: (i) outputting question content via an output device (i.e. a Machine Peripheral component 30), (ii) dispensing products via a product dispensing mechanism (i.e. a Machine Peripheral component 30), and/or (iii) dispensing change due to a customer via a payment processing mechanism, which may include a change dispenser and a currency storage apparatus (i.e. several Machine Peripheral components 30). As stated, the Machine Peripheral component 30 generally represents machine hardware, including mechanical hardware such as input devices, output devices, inventory dispensing mechanisms, and payment processing mechanisms including coin acceptors, bill validators, card readers, change dispensers, etc.

Process Steps

Various embodiments allow, among other things, the controlling of access to vending machine products based on a customer's success in answering one or more questions.

In one embodiment, health-related educational questions are output to potential customers who must in turn answer one or more questions correctly before they are permitted to purchase vended food and/or drink from one or more vending machines. In another embodiment, even if a customer answers a question (even all questions) incorrectly, the customer is then provided with the correct answers. Such embodiments would ensure that customers possess or are provided with certain health-related information before they are permitted to acquire products from the vending machine.

Various embodiments are contemplated, as discussed herein.

Figure 2:
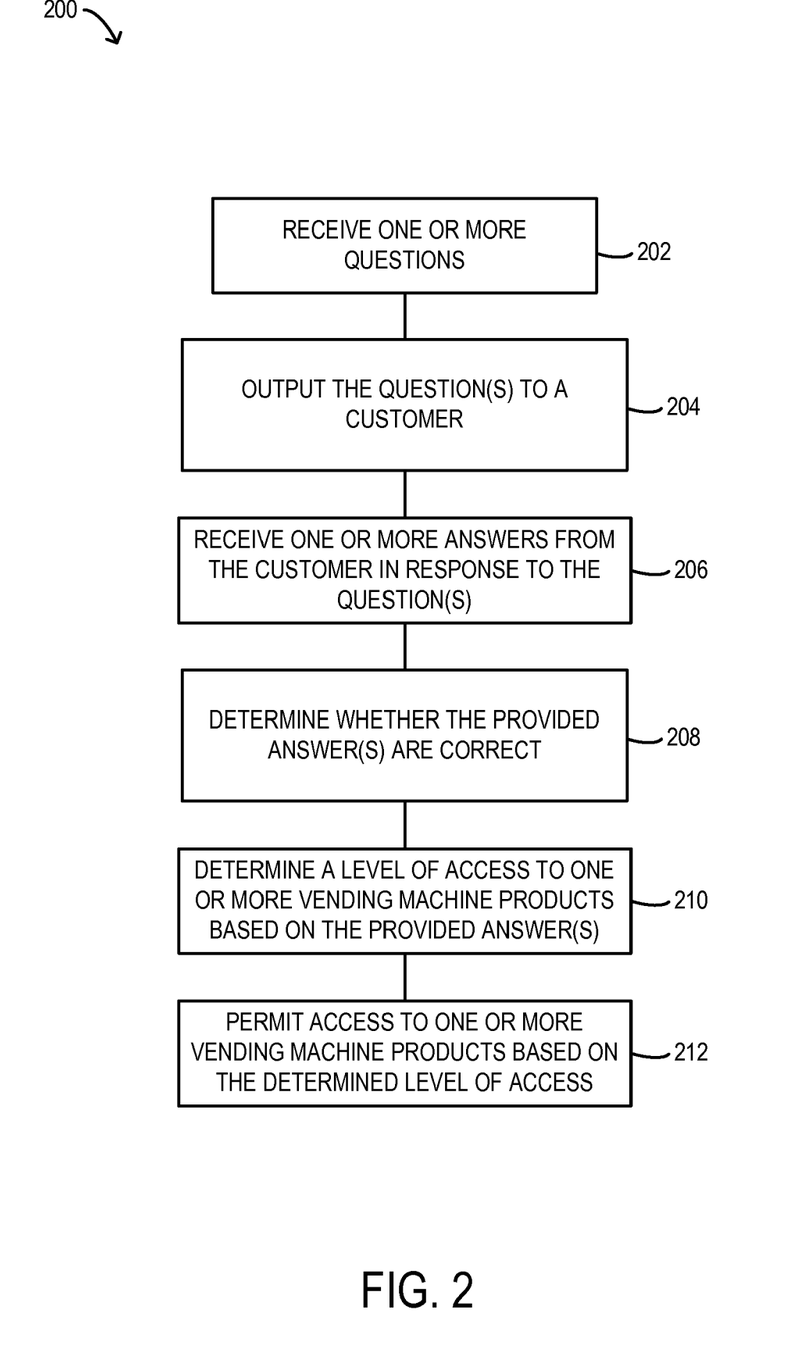
FIG. 2 is a flowchart of a method according to some embodiments.

In one embodiment, as illustrated in FIG. 2, a vending machine is configured to perform a process 200 which includes the following steps (albeit not necessarily in the disclosed sequence): (i) receive one or more questions, at 202, (ii) output the question(s) to a customer, at 204, (iii) receive one or more answers from the customer in response to the question(s), at 206, (iv) determine whether the provided answer(s) are correct, at 208, (v) determine a level of access to one or more vending machine products based on the provided answer(s), at 210, and (vi) permit access to one or more vending machine products based on the determined level of access, at 212. The flow diagrams described herein (e.g., of the method 200) do not necessarily imply a fixed order to the actions (unless otherwise specified), and embodiments may be performed in any order that is practicable. Note that any of the methods (e.g., process 200) described herein may be performed by hardware, software (including microcode), firmware, or any combination thereof. For example, a storage medium may store thereon instructions that when executed by a machine result in performance according to any of the embodiments described herein.

Some or all of the following steps of this process (and other disclosed processes) may be performed by a remote device and/or computer, such as a cellular phone, personal computer, or web server.

Step 100: Receive a Question (Question Storage)

The vending machine control system and/or vending machine memory receives one or more questions from any of a number of sources.

In one embodiment, an operator may store (or have stored) one or more questions in a vending machine's local memory (e.g. a question database) by, for example, (1) typing questions and corresponding answer choices into a keypad or keyboard, (2) uploading questions from a handheld device such as a PDA (via a wired or wireless connection) or from a portable USB memory (e.g. a USB flash memory, a USB key fob or "dongle"), (3) uploading questions from a floppy disc or other computer readable medium, (4) downloading questions from a remote computer over a computer network such as the Internet, and/or (5) inserting a computer-readable medium, such as a CD, DVD or semiconductor memory, into the vending machine or a vending machine peripheral, in which the inserted computer-readable medium forms a part of the vending machine's local memory.

In some embodiments, questions, answers to questions and/or other data relating to questions may be received by a vending machine at the end of a fill period. For example, when an operator restocks a vending machine, the operator may upload or download a plurality of questions and other data so that the vending machine can output questions to customers and/or potential customers throughout the upcoming fill period. In other embodiments, vending machines may be configured to download questions and other data from a remote computer periodically (e.g. nightly) or as needed (e.g., on a transaction by transaction basis). In embodiments where questions and other data are to be downloaded individually to a vending machine from a remote computer, the vending machine may download and store, e.g., a question before a customer engages a vending machine (as discussed herein) or in response to a customer's engaging a vending machine (e.g. in response to the various question triggering rules described herein).

In some embodiments, questions and/or other data may be received by the vending machine control system by receiving question content from product packaging. For example, a bar code or radio frequency transmitter (e.g. RFID tag) affixed to a product may transmit data (directly or indirectly) to a vending machine control system or memory. Such an embodiment may be useful in situations where questions are tailored to each specific product. Further, such embodiments may be useful as they may eliminate the need for storing questions or other data in a vending machine memory because, when a product is selected, the vending machine control system may then choose to, e.g., read the question and answer data from the product, rather than from a vending machine memory.

A sample database which may be employed to store questions and answers is illustrated below.

| Questions and Answers | | | |
|---|---|---|---|
| Question ID | Question | Answer Set | Correct Answer |
| Q01 | How much fat is in an Acme candy bar? | A = 1 gram; B = 4 grams; C = 8 grams | C |
| Q02 | How many calories are in a bag of Smith Potato Snacks? | A = 1000; B = 500; C = 400; D = 250 | D |
| Q03 | How many grams of sugar are in an Acme candy bar? | An integer between 0 and 100 | 24, (score = 100% for answering 24, or reduce score by 10% for every gram by which answer differs from 24) |
| Q04 | Which of the following has the lowest number of calories? | A = Acme candy bar; B = Smith Potato Snacks; C = can of Coughlin Cola; D = box of Prince peanuts | C |
| Q05 | Which of the following contributes more calories? | A = 1 gram of fat; B = 1.5 grams of protein C = 1 gram of carbohydrates | A |

The database illustrated above includes a plurality of records which each represent a questions and corresponding possible and correct answers. Moreover, a record may indicate that answers which are not strictly correct are to be given a score. For example, the record indicated by the ID 'Q03' indicates that a score of 100% is granted for the answer '24', but other answers result in other non-zero scores (e.g., an answer of '26' differs from the correct score '24' by '2', so the score for the answer '25' would be 100%−(10%×2)=80%).

The content and format of questions are not limited to the types of questions disclosed herein. Questions may be, but need to be, applicable to a product (Acme candy bar, 10 oz. Can of Coca-Cola® Cherry Coke) or to a type of product (e.g., beverages, carbonated sweetened beverages, potato chips). Questions may be generally applicable to all products, or to no products.

Step 200: Output a Question to a Customer

The vending machine control system facilitates the outputting of one or more questions through one or more output devices (e.g. LCD displays, LED displays, audio speakers, CRT monitors, etc.) or separate devices (e.g., questions are output via a kiosk). In an embodiment, the questions are output when predefined rules are met, and thus those rules can determine whether and when questions are output to a customer.

Such rules may be, e.g., stored in a database accessible (locally or remotely) to the vending control system. The rules may provide that questions are to be output when the vending machine control system detects, through the machine peripherals, one or more of: (1) physical motion within the proximity of the vending machine (via motion detector), (2) the deposit of currency into the vending machine's payment processing mechanisms (e.g. the coin acceptor and/or bill validator), (3) the selection of a particular product (e.g. through a keypad), (4) the receipt of a unique or substantially unique customer identifier, such as a customer's personal identification number (PIN), credit card number, debit card number, or biometric identifier (e.g. fingerprint, retinal or iris patterns, topical facial pattern), and/or (5) immediately before a product would otherwise be dispensed. For example, one or more questions may be output after a customer inserts sufficient payment and selects a product to purchase.

From a database of questions, questions may be selected for output based on various criteria, such as (1) the customer's identifier, (2) the product selected, (3) the categories of products inventoried in the machine, (4) the amount deposited, (5) the time/date, (6) a random or pseudorandom determination, and/or (7) any other data point determined to be relevant to the selection of a question.

In an embodiment, rules may determine which question(s) are output. Such rules may be, e.g., stored in a database accessible to the vending machine. One or more of the rules may be selectively active, such that, when a rule is deemed inactive that rule is not considered is determining which question(s) are output. An example of a database which stores such rules is illustrated below, and may be referenced in combination with the table above that describes questions and answers.

| QUESTION APPLICABILITY RULES | | | |
|---|---|---|---|
| Question Applicability ID | Event | Question to output | Active? |
| QA01 | Acme candy bar selected | Q01 | YES |
| QA02 | Acme candy bar selected | Q01, then Q04 | YES |
| QA03 | Acme candy bar selected | Randomly select one from among Q01, Q03 and Q05 | NO |
| QA04 | Beverage Selected | Randomly select one from between Q03 and Q05 | NO |
| QA05 | Any product selected | Q04 | NO |

In an embodiment where one or more of the rules is selectively active, rules may be 'turned off' according to various criteria (e.g., time of day, revenue management considerations, inventory levels, the desires of an operator).

In an embodiment, it can be desirable to select questions based (at least in part) on the customer's identifier. In this way, questions may be selected based on the customer's history of transacting with a vending machine. For example, 'beginner' customers who have no established history of answering such questions may receive relatively easier, more fundamental questions. On the other hand, customers who have demonstrated a high degree of knowledge in a particular area may receive relatively more difficult questions (i.e. customers may "graduate" to higher levels).

In an embodiment where customer question and answer histories are stored (e.g., in a database accessible to the vending machine), inter-transactional games may be facilitated so that customers gain standing in an ongoing game by virtue of their transactions (e.g., a customer's standing increases every time he transacts with the vending machine). For example, customers may be offered the chance to become the area's expert on National Football League facts by registering to answer several hundred questions over the next month. The top scorer in the game that month may win a special prize (e.g. all the currency then stored in the vending machine; tickets to a sporting event) and may have his or her name displayed on an output device, such as the top-mounted scrolling LED display described above (e.g., such an LED display may read "January's #1 Patriots fan is Jen Smith from the Customer Service Department!"). The scores of different people may be compared or evaluated with respect to each other, as in a tournament style competition where, e.g., the people with the ten highest scores are considered "semi-finalists", and can compete against each other in a subsequent round, game, etc.

Any type of subject matter may be the subject of such a game. For example, besides sports related questions, questions may relate to school subjects such as Spanish, Trigonometry, U.S. History, and the like. Such an embodiment could be employed, e.g., in a school where students were effectively in competition with one another to score higher on questions for school-related subjects. Students could compare scores, with the high scorer(s) being awarded various accolades, prizes, etc.

In addition, games, tournaments, questions, etc. may be offered at particular times, such as times when few transactions take place at the vending machine (low-demand times), at regular intervals (e.g., every hour on the hour, every day at noon) and other times as desired.

Questions may be output through one or more output devices, including, but not limited to (1) LCDs, (2) LED screens/displays, (3) visual monitors (CRT or otherwise), (4) audio speakers (including unidirectional speakers), (5) printed material provided through the machine's printer, (6) a communication port (e.g., infrared transceivers, radio frequency (RF) transceivers, cellular transceivers, modems, or the like for transmitting questions to and receiving answers from remote devices such as PDAs, cellular telephones, computers, etc.).

The content of a question is not limited in any manner, and may involve any topic, issue or genre. For example, questions may concern health issues (including fitness, nutrition, allergies and the like), sports issues, entertainment trivia, history, and science. Questions may be presented within the context of themed games, which may be based on popular games, television shows, and brands. Questions can concern particular products or categories of products.

Step 300: Receive an Answer From the Customer in Response to the Question

At Step 300, a customer provides his or her answer by inputting the answer into an input device. In one embodiment, the input device is a vending machine peripheral, such as a vending machine's keypad or touch screen. For example, where a customer is provided with a multiple choice question, the possible answer selections may appear in different "button" icons that are shown on a touch screen display. The customer could select an answer by depressing the icon area on the touch screen. In another embodiment, a customer may provide answers by pressing buttons on a keypad of the vending machine, where the buttons are correlated to answer selections communicated through an output device (e.g. an LED screen). For example, a set of buttons may be labeled '0' through '9', and an output device may display a message that buttons '1' through '5' are correlated to certain answer selections of a question that has been output.

In an embodiment where the customer has received the question(s) on a printed document (e.g., a ticket dispensed through the vending machine's printer), the document may include indicia denoting fillable areas intended for the customer's answer(s) to the question(s). For example, a printed ticket may contain several fillable ovals or circles that the customer can fill in with a pencil to indicate her answer selections to one or more questions. The completed ticket, which would effectively serve as the customer's set of answers, may be input into the machine's bill validator so that the answers can be read (e.g., optically) in a manner known in the art and provided to the vending machine control system.

In an embodiment, the input device may comprise a separate customer device, such as a cell phone or personal computer. Thus, the customer may provide answers through a separate device, which, in one embodiment, transmits the customer's answer choices to the vending machine control system, either directly (such as through a BlueTooth™ connection), or indirectly (such as through an IVRU which receives customer answers via telephone and relays them to the vending machine control system).

In an embodiment in which a user inputs answers to the vending machine via a separate device, the answers need not be transmitted to the vending machine control system for a determination of whether or not the provided answers are correct. Rather, the separate device can determine if the answers provided are correct. To communicate this determination or result of this determination, the separate device can generate and output a code (e.g., a sequence of numeric or alphanumeric digits). The code, when presented to a vending machine, would permit one or more products to be dispensed (e.g., for free or for a discount). The code would be acceptable if, e.g., the vending machine validates the code as authentic (i.e. produced pursuant to a determination that the answers provided are correct) in any of a number of known manners. The code may be associated with one or more particular products, allowing such product(s) to be redeemed (i.e. dispensed by the vending machine when the code is received). The code may represent an amount of credit (e.g., $0.75), such that the code may be used as payment in place of or in addition to currency.

In embodiments where questions are output through vending machine output devices, and answers are to be received through vending machine input devices, the machine may end the transaction (e.g., revert to a normal sales mode or to an "attract" mode) if answers to questions are not received within a threshold period of time (e.g. after 30 seconds without receiving an answer, the vending machine cancels the transaction which prompted the questions to be output).

In an embodiment, the customer may be provided an opportunity to cancel the transaction, such as canceling the transaction after the question has been output. Such an embodiment can be advantageous where the customer changes his mind based on information in the question.

Step 400: Determine Whether the Provided Answer is Correct or Incorrect

At Step 400, the vending machine control system determines whether the customer's provided answer is correct or incorrect. That is, the vending machine control system may evaluate the received answer by comparing the received answer to a correct answer (e.g., that corresponds in a database record to the output question).

Alternatively, the vending machine control system may determine the degree to which a particular answer is correct or incorrect, rather than simply making a "binary" determination of correctness. For example, certain answer choices may provide more "points" toward a total score that is used to determine access. For example, a score from 0% to 100% may be awarded an answer, where 100% represents a 'perfect' answer.

As described herein, a determination of a correct answer is not required in all embodiments. For example, a question may be output and an answer may be required but the accuracy of the answer does not affect the level of access granted. Such an embodiment can be advantageous where it is desirable to inform a customer without significantly deterring the customer.

In some embodiments, customers who have provided incorrect answers might be given one or more additional opportunities to provide a correct answer. In such embodiments, upon the provision of an incorrect answer the process may return to Step 200 to output the same of a different question.

Step 500: Determine Level of Access to One or More Vending Machine Products Based the Provided Answer(s).

The vending machine control system then determines, based on the answer (e.g., whether the answer is correct, whether the answer results in a high enough score, whether a minimum percentage of questions were answered correctly), a level of access to one or more vending machine products. Access may include (i) whether any product may be dispensed, (ii) which products are allowed to be dispensed, and/or (iii) a price or discount on products dispensed.

For example, access may include the vending machine being configured to permit the purchase of vending machine products (i.e., the vending machine may be "locked" or "unavailable" to prospective customers who do not answer questions correctly). More specifically, access may include the customer being permitted to purchase (1) any inventoried product, (2) products from a specific inventory group, (3) particular products and/or (4) one or more time periods over which the purchase(s) may be made.

In an embodiment, access may include the vending machine being configured to permit the purchasing of vending machine products at a discount off of the retail prices of the products. In an embodiment, access may include the customer being awarded a free item or a credit toward a free item. In an embodiment, access may include the customer being awarded an entry into a sweepstakes. The access afforded a customer may increase for 'better' answers to questions (e.g., for higher scores, for greater percentages of questions answered correctly, for greater numbers of questions answered correctly).

In one embodiment, based on the answer (e.g., if the provided answer is incorrect) the vending machine control system may be configured to deny access to all vending machine products (i.e. the customer can make no purchase).

In some embodiments, access to vending machine products may be determined based on the customer's success in answering several questions. In such embodiments, several questions may be output (e.g., the process repeats from Step 200 several times, several questions are output simultaneously) as appropriate. The vending machine control system may store (e.g. in RAM) a 'running count' of answer data, such as the number of correct answers provided, the aggregate score of all answers, etc. Such a running count would to permit the vending machine to determine a level of access to vending machine products once the customer has answered the questions. In an embodiment involving a plurality of questions, the vending machine control system may be programmed to output progressively more difficult questions throughout the question session.

Depending on the answers provided (e.g., based on the correctness of the provided answers), the vending machine control system identifies an appropriate level of access to vending machine products. The vending machine control system may make such a determination by referencing a database that provides rules for permitting access to vending machine products. An example of such a database is illustrated below.

| ACCESS RULES | |
| --- | --- |
| Access IDENTIFIER | Access |
| A01 ("restrictive") | Allow sale only if total score = 100% |
| A02 (""flexible majority) | Allow sale if total score >50% |
| A03 ("majority") | Allow sale if majority of questions answered with a score of >80% each |
| QA04 ("informational") | Allow regardless of answer(s) |
| QA05 | Allow access to all products if all answers correct; Allow access to low demand items if majority of answers are correct; Otherwise deny sale |
| QA06 | Provide $0.50 discount on any product |
| QA07 | Provide $0.75 discount if all answers correct; Provide $0.50 discount if majority of answers are correct; Otherwise no discount |

In an embodiment, access may be restricted (e.g., sale of only certain items is permitted) unless customers (1) answer questions correctly or sufficiently accurately, and/or (2) purchase one or more additional products (e.g. products determined to meet certain nutritional standards, products that are 'sponsored' or otherwise preferred). Such an embodiment can promote the sale of those products which must be purchased.

Step 600: Permit Access to One or More Vending Machine Products Based on the Determined Level of Access.

Based on the determined level of access, the vending machine control system permits access to one or more vending machine products.

In an embodiment (e.g., where prospective customers are required to answer one or more questions correctly before they are permitted to purchase vending machine products) the vending machine may simply permit conventional vending machine transactions once it has been determined that complete access should be granted (e.g., because a customer has answered the requisite number of questions correctly). Such an embodiment may be useful in school settings as it may function to educate and/or ensure a certain level of education about nutrition before students are permitted to purchase commonly vended products such as candy and soda.

Such an embodiment may also be useful in a situation where a vending machine is configured to dispense drugs, alcohol, tobacco and the like, since questions may function to ensure a certain level of customer awareness about the risks of consuming such products. For example, a customer who attempts to purchase cigarettes might be asked a question such as "Are you aware that the U.S. Surgeon General has determined that cigarette smoking causes heart disease?" If the customer answers "yes", then the customer would thereby have provided his "informed consent", essentially assuming the risks of smoking cigarettes, in which case the vending machine might then dispense the requested cigarettes upon tender of payment.

In an embodiment, the customer may be informed (e.g., via questions or other messages output by a vending machine) of other risks, such as the risks of an allergic reaction to a product or a component thereof. For example, each selection by a customer of a product that contains peanuts may prompt a question to be output, such as "This product contains peanuts, which some people are allergic to. Are you sure you want to purchase this product?"

In an embodiment, the fact that the customer has answered a question may be stored. For example, it can be advantageous to store an indication that a customer has provided his informed consent by answering a question asking if the customer is aware of certain information (e.g., health risks of a product). In such an embodiment, it can be advantageous to store an indication of the identity of the customer, such as a name, credit card number, other account number or other means for identifying the customer. Such stored information might be, e.g., used as proof that a particular customer had certain knowledge (e.g., the knowledge provided in the form of a question or other message provided by a vending machine).

In an embodiment, other information may be stored, whether or not stored in association with a customer identifier. For example, the following types of information may be stored: (1) the customer who answered a question or otherwise received certain information (e.g., in the form of a message output by the vending machine); (2) the question answered/viewed by the customer; (3) the particular answer (if any) given by the customer.

In some embodiments, customers may be provided with a discount toward one or more vending machine products if they answer one or more questions correctly. In such embodiments, once the vending machine control system has determined that the customer has answered a threshold number of questions correctly, it may add monetary value to a credit balance available for the purchase of products (thereby permitting the customer to apply that monetary value toward the purchase of one or more vending machine products). In an embodiment, the monetary value added to the credit balance is not available for cashing out by the customer, so that the monetary value must be used (if at all) to purchase a product.

In some embodiments, the determined level of access may be granted for a limited period of time. In an embodiment where the vending machine control system determines the level of access, the vending machine control system may, e.g., start a timer so that the customer may be provided with the determined level of access for up to a predetermined amount of time. For example, in an embodiment where a customer is provided with the ability to simply purchase one or more products from a vending machine, the vending machine may be "unlocked" (i.e. purchases may be enabled) for only one minute after the provision of a correct answer. In one embodiment, while unlocked, the products may be dispensed. In one embodiment, in addition to or instead of "unlocking" the vending machine, the vending machine may provide a code which is redeemable for a vending machine product in a known manner (e.g., a code that may be used a single time at a vending machine).

Alternatively or additionally, the machine may be unlocked until the control system detects, via a motion detector, that no customers are within a given proximity of the vending machine.

EXAMPLES OF VARIOUS EMBODIMENTS

The examples below illustrate embodiments of the invention. These examples are in no way limiting on the scope of the invention.

Example 1

A set of vending machines is located in a school. The vending machines are configured to only permit transactions if customers present codes that are stored in the memories of the vending machines.

A student in the school wishes to purchase a chocolate bar from a particular vending machine. The student walks up to the vending machine, and reads a sign thereon which instructs the student that in order to purchase products from the vending machine, he must first proceed to a nearby kiosk, play a health-related question-and-answer game, and obtain an "access code" from the kiosk.

The student proceeds to the nearby kiosk. The student initiates a health-related question-and-answer game on the kiosk by pressing a "start button" on the kiosk's touch screen, and proceeds to answer four questions about nutrition. For example, one question presented on the screen reads "Which choice is highest in Vitamin D?" The question is accompanied by four images of different food choice options, including a glass of milk, a bag of pretzels, a hot dog, and a glass of water. Each image may represent a "button" on the touch screen, so that answer selection is made easy and intuitive.

After the student answers three of four questions correctly, the kiosk outputs an access code. Upon the student's entry of the code into the keypad of a vending machine, the machine permits a single vending machine transaction, pursuant to which the student purchases the desired chocolate bar.

Example 2

A middle-aged woman wishes to buy cigarettes from a vending machine. The vending machine is retrofitted with a separate device mounted on one side of the vending machine. The separate device is configured to permit transactions with the vending machine only if customers answer one question that effectively proves their "informed consent" to the risks of cigarette smoking. An LED display on the separate, retrofitted device outputs a question reading: "True or false: The U.S. Surgeon General has determined that smoking causes heart disease". After pressing a button marked "true" on the separate device, the separate device sends a signal to the vending machine's control system and/or to the vending machine's payment processing apparatus, instructing it to permit one transaction within the next two minutes, or more transactions provided additional questions are output and answered correctly.

Example 3

A worker in an office building is a baseball fan. After working hard on a big project, he is hungry and wants to take a break. He proceeds to a vending machine in the office building's lobby, and sees a sign thereon, which reads, "Win a $0.50 credit toward any snack in the machine. Just call 1-888-NEXTVEND to play our sports trivia game!" He calls the phone number on his cellular telephone and is connected to an IVRU that prompts him with sports-related questions. He provides his answer choices by pressing buttons his phone, which transmits DTMF tones to the IVRU. After determining that the customer has answered 75% of the questions correctly, the IVRU transmits a signal to the vending machine control system instructing it to increase the credit balance by $0.50 for the next transaction. The worker then purchases a $0.75 candy bar by depositing $0.25 in the machine and selecting the candy bar through the machine's keypad.

Further Embodiments

The vending machine may store information regarding the answers provided to questions and/or the accuracy of answers to questions (e.g., whether a question was answered correctly or incorrectly). Then, such stored information may be retrieved (e.g., copied by an operator during a restocking, copied across a network from the vending machine) and utilized in various manners. For example, the information may be used to determine which areas (e.g., which schools where the operator's vending machine are located) have high percentages of accurate answers and which do not.

In an embodiment, access codes may be good for multiple transactions or for a period of time that may permit several transactions. Thus, customers who have demonstrated a certain level of understanding about a certain subject matter (e.g. nutrition) might be permitted to transact with a machine for a predetermined time period before having to "re-qualify" by answering additional questions.

In an embodiment, before or after questions are output (e.g. during an "attract" mode or immediately following a question/answer session), a vending machine may be configured to output educational content that is designed to educate customers about various subject matter. For example, in a cigarette vending machine embodiment, educational content may comprise audio-video output of a "teacher" who describes the health risks of smoking. In a snack machine embodiment, educational content may comprise audio-video output of a teacher who describes the nutritional content of one or more snack items that are available for sale by the vending machine.

In an embodiment, customers may be required to pay a "cash entry fee" in order to participate in question and answer sessions. For example, a customer may be required to deposit $0.25 before questions are output.

In an embodiment, after completing an access-oriented question, customers may be provided with the opportunity to answer an additional question or questions for a "bonus" credit (e.g., $0.25 additional credit).

We claim:

1. A method of operating a vending machine, comprising:
   receiving, at the vending machine, an indication of a product selected by a customer;
   selecting, based on the product selected by the customer, a plurality of questions, wherein the plurality of questions are at least one of:
   (i) downloaded by the vending machine from a remote computer;
   (ii) accessed by the vending machine from a removable memory medium; and
   (iii) read by the vending machine from a packaging of the selected product;
   outputting, in response to the receiving of the indication of the selected product, the plurality of questions to the customer;

receiving, at the vending machine and from the customer, an indication of an answer to each of the plurality of questions;

scoring, by the vending machine, the customer's answers, thereby determining a score for the customer;

determining, by the vending machine and based on the customer's score, which of a plurality of pre-determined levels of access the customer has achieved, wherein each of the plurality of pre-determined levels of access defines a different subset of products that may be purchased from the vending machine; and selling to the customer, via the vending machine and in the case that the product selected by the customer is a member of the subset of products that corresponds to the specific pre-determined level of access achieved by the customer, a unit of the product.

2. The method of claim 1, further comprising:

preventing a selling to the customer, via the vending machine and in the case that the product selected by the customer is not a member of the subset of products that corresponds to the specific pre-determined level of access achieved by the customer, a unit of the product.

3. The method of claim 1, wherein the plurality of questions is stored in a memory of the vending machine.

4. The method of claim 1, wherein the selecting of the plurality of questions is based on at least one of: (i) an identifier of the customer; (ii) an amount of money provided by the customer to the vending machine; and (iii) a random selection.

5. The method of claim 1, wherein the receiving of the indication of the answer to each of the plurality of questions comprises at least one of: (i) receiving the indication wirelessly from an electronic device operated by the customer; and (ii) receiving, via the vending machine, a paper substrate upon which the customer has indicated the answers.

6. The method of claim 5, wherein the outputting comprises:

outputting the paper substrate to the customer, wherein the paper substrate is printed with indications of the plurality of questions.

7. A method of operating a vending machine, comprising:

receiving, at the vending machine, an indication of a product selected by a customer;

selecting, based on at least one of:
(i) an identifier of the customer;
(ii) an amount of money provided by the customer to the vending machine; and
(iii) a random selection;
a plurality of questions;

outputting, in response to the receiving of the indication of the selected product, the plurality of questions to the customer;

receiving, at the vending machine and from the customer, an indication of an answer to each of the plurality of questions;

scoring, by the vending machine, the customer's answers, thereby determining a score for the customer;

determining, by the vending machine and based on the customer's score, which of a plurality of pre-determined levels of access the customer has achieved, wherein each of the plurality of pre-determined levels of access defines a different subset of products that may be purchased from the vending machine; and selling to the customer, via the vending machine and in the case that the product selected by the customer is a member of the subset of products that corresponds to the specific pre-determined level of access achieved by the customer, a unit of the product.

8. The method of claim 7, wherein the plurality of questions is at least one of: (i) downloaded by the vending machine from a remote computer; (ii) accessed by the vending machine from a removable memory medium; and (iii) read by the vending machine from a packaging of the selected product.

9. The method of claim 7, further comprising:

preventing a selling to the customer, via the vending machine and in the case that the product selected by the customer is not a member of the subset of products that corresponds to the specific pre-determined level of access achieved by the customer, a unit of the product.

10. The method of claim 7, wherein the plurality of questions is stored in a memory of the vending machine.

11. The method of claim 7, wherein the receiving of the indication of the answer to each of the plurality of questions comprises at least one of: (i) receiving the indication wirelessly from an electronic device operated by the customer; and (ii) receiving, via the vending machine, a paper substrate upon which the customer has indicated the answers.

12. A method of operating a vending machine, comprising:

receiving, at the vending machine, an indication of a product selected by a customer;

outputting, in response to the receiving of the indication of the selected product, a plurality of questions to the customer;

receiving, at the vending machine and from the customer, an indication of an answer to each of the plurality of questions, wherein the receiving of the indication of the answer to each of the plurality of questions comprises at least one of:
  (i) receiving the indication wirelessly from an electronic device operated by the customer; and
  (ii) receiving, via the vending machine, a paper substrate upon which the customer has indicated the answers;

scoring, by the vending machine, the customer's answers, thereby determining a score for the customer;

determining, by the vending machine and based on the customer's score, which of a plurality of pre-determined levels of access the customer has achieved, wherein each of the plurality of pre-determined levels of access defines a different subset of products that may be purchased from the vending machine; and selling to the customer, via the vending machine and in the case that the product selected by the customer is a member of the subset of products that corresponds to the specific pre-determined level of access achieved by the customer, a unit of the product.

13. The method of claim 12, wherein the outputting comprises:

outputting the paper substrate to the customer, wherein the paper substrate is printed with indications of the plurality of questions.

14. The method of claim 11, wherein the outputting comprises:

outputting the paper substrate to the customer, wherein the paper substrate is printed with indications of the plurality of questions.

15. The method of claim 12, wherein the plurality of questions is at least one of: (i) downloaded by the vending machine from a remote computer; (ii) accessed by the vending machine from a removable memory medium; and (iii) read by the vending machine from a packaging of the selected product.

16. The method of claim 12, further comprising:
preventing a selling to the customer, via the vending machine and in the case that the product selected by the customer is not a member of the subset of products that corresponds to the specific pre-determined level of access achieved by the customer, a unit of the product.

17. The method of claim 12, wherein the plurality of questions is stored in a memory of the vending machine.

18. The method of claim 12, further comprising:
selecting the plurality of questions based on at least one of:
(i) an identifier of the customer; (ii) an amount of money provided by the customer to the vending machine; and (iii) a random selection.

* * * * *